Nov. 10, 1959 D. S. HORSLEY 2,912,487

ELECTRONIC MOTION PICTURE PRINTER

Filed April 17, 1958 2 Sheets-Sheet 1

INVENTOR.
DAVID S. HORSLEY
BY Harry R. Lubcke
AGENT

ELECTRONIC MOTION PICTURE PRINTER

Filed April 17, 1958 2 Sheets-Sheet 2

INVENTOR.
DAVID S. HORSLEY
BY Harry R. Lubcke
AGENT 2,912,487
Patented Nov. 10, 1959

2,912,487

ELECTRONIC MOTION PICTURE PRINTER

David S. Horsley, Hollywood, Calif.

Application April 17, 1958, Serial No. 729,121

19 Claims. (Cl. 178—5.2)

My invention relates to electronic means for printing motion picture film and particularly for printing in color in a desired geometrical format from an original film of different format.

With the advent of Cinemascope, Technirama, Panavision and other anamorphised formats, and with the several film widths, as 8 mm., 16 mm., 35 mm., 55 mm., 65 mm. and 70 mm., and with the 90° image orientation of Vistavision, it will be understood that conversion of pictorial information from one film format to another now transcends the versatility of optics and mechanics.

Accordingly, I have provided a universal electronic printer which is capable of accepting an original film, either negative or positive, and printing either a negative or a positive in substantially any other format. This includes ninety-degree reorientation of the image, as from Vistavision to the more usual placement of the height of the image in the direction of translation of the film strip.

This I accomplish by transporting the original film at uniform speed and scanning the same transversely with a white-light-emitting spot from a flying spot cathode-ray tube. The velocity with which the film is translated is registered by photoelectric means coactive with selected sprocket holes of the original film. The persistence of the cathode-ray tube phosphor is, of course, very short. It will be appreciated that this processing can be carried out at standard television repetition speeds, though it need not be. I prefer to operate at from one-half to one-eighth such speeds in order to obtain increased resolution. An optical system reduces the image size of the cathode-ray tube spot on the original film by a factor of the order of four, thus the required small spot of light upon the film is obtained.

Behind the original film at least two dichroic mirrors coact with three photomultiplier tubes to provide three simultaneous video signals corresponding to primary colors or the equivalents thereof. This is normally red, green and blue transmission and reflection by such filters as will be later explained. Separate amplifiers amplify each of these signals.

An electronic computer, in the form of card and tape readers, connects to the flying spot cathode-ray tube to determine the intensity of the spot thereof for fades or the accommodation of different density original material, the position of the scanning traverse transverse of the original film, the extent of the traverse and whether it be transverse of the film as usual or longitudinal of the original film in one manner of re-orienting Vistavision frames. The computer readers are also connected to the separate amplifiers to control the individual gains, gamma and other functions in order to compensate for color unbalance in the original film and for other reasons.

For exposing unexposed color film, means are provided within a light-proof enclosure to transport the film at a speed analogous to that of the original film. Color television image reproducing means optically influence said unexposed film through a reduction optical system in the same manner as described in connection with the original film. Through a servo control the electrical output from a photoelectric means coacts with the sprocket holes of the original film to regulate the relative speeds of the original and the unexposed films. These speeds may be the same for 35 mm. to 35 mm., but quite different for 35 mm. to 16 mm. or for other changes in format. Cards and paper or magnetic tape program the readers. The cards determine the parameters fixed from conversion of one format to another and the tape the running instructions according to the characteristics of the original film and those desired in the new print.

An object of my invention is to provide a motion picture film printer capable of converting film from one format to another over a wide range of formats.

Another object is to provide an electronic printer having greater flexibility in obtaining desired characteristics in the print than has been heretofore possible.

Another object is to provide a television-like picture of the processing from original to print while such processing is taking place.

Another object is to vary the density range of the reproduced film with respect to that of the original film by an electronic signal control which does not alter the intra-range gradations of density.

Another object is to accomplish increased resolution in film printing over that obtained in television broadcasting operations by operating the apparatus more slowly.

Another object is to obtain accurate image registration by electronic means.

Other objects of my invention will become apparent upon reading the following detailed specification and upon examining the accompanying drawings, in which are set forth by way of illustration and example certain embodiments of my invention.

Figure 1:
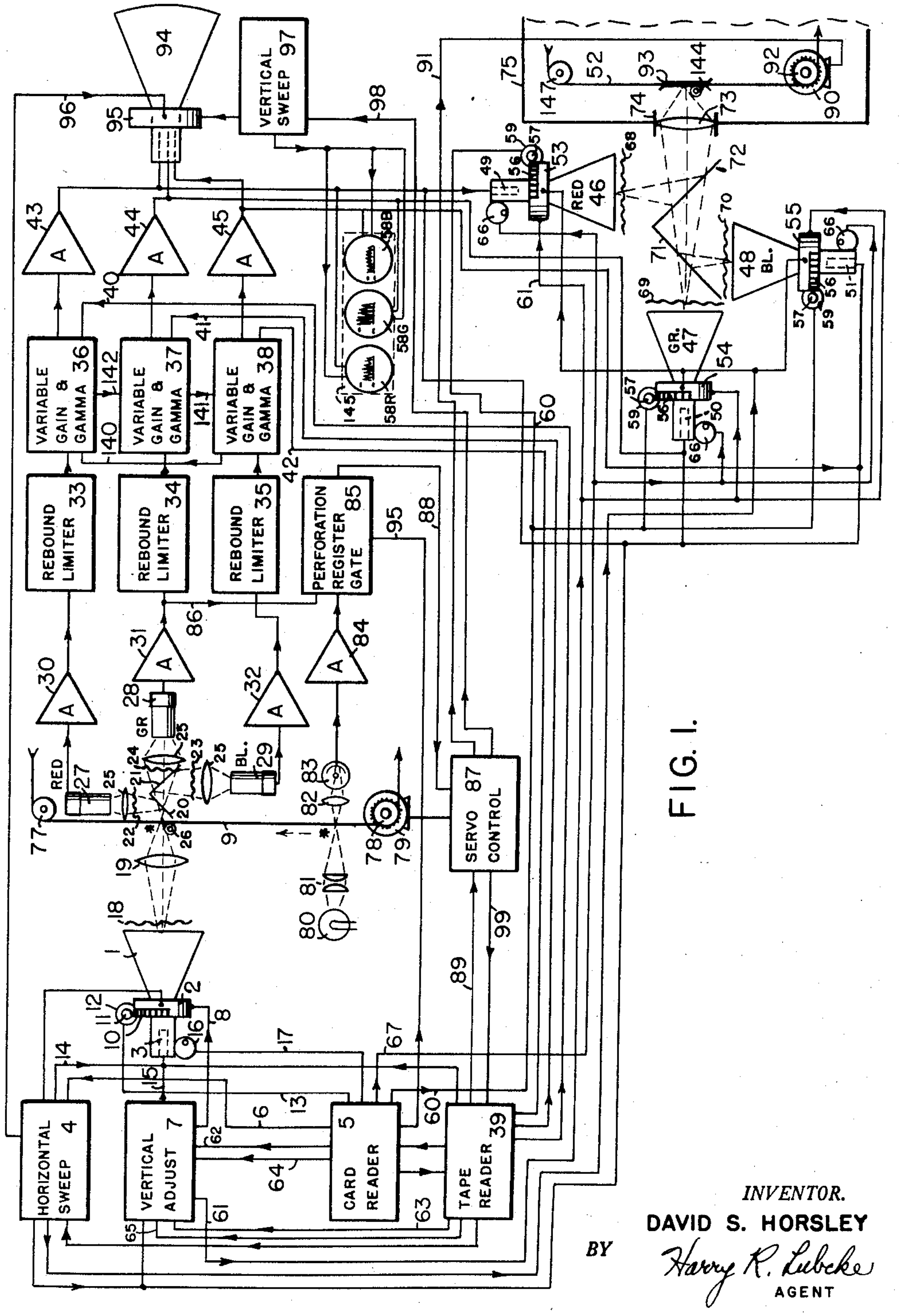
Fig. 1 shows the general layout of my electronic printer.

In Fig. 1 electronic elements are given in block form, mechanical elements in simplified form with no showing of obvious mountings and optical elements in proportion but of simplified representation.

In Fig. 1 number 1 indicates a high-intensity high-voltage cathode-ray tube having a rapid decay phosphor and forming the essential element of a modified flying spot scanner. The RCA type 5AUP24 tube having a phosphor with a $10^{-6}$ second decay, or faster, or the Du Mont K1347 tube having a P15 phosphor are suitable available examples. It is operated at a high voltage of many thousands of volts and is provided with known electron focusing means.

Horizontal and vertical deflection yoke 2 deflects the electron stream of the tube 1, the stream being formed by electron gun 3. Horizontal sweep 4 produces sawtooth waveform scanning energy and is connected to yoke 2.

By scanning at less than usual television speeds I allow more time for phosphor decay in relation to the distance traversed and so secure increased resolution. The frequency of the sawtooth scan of sweep 4 is thus arranged to be adjustable over the range of from one-eighth to one-half of the standard television frequency of 15,750 cycles per second. The frequency chosen is determined by a punched card inserted in card reader 5 for the particular run. The card reader and sweep are connected by conductor 6 to effect this control.

Transverse film scanning is accomplished by the horizontal sweep but the longitudinal scanning thereof is accomplished by motion of the film itself. Accordingly, a vertical scanning sweep in the usual sense is not provided, but a vertical adjust scanning waveform source 7 instead. This source is direct coupled to yoke 2 by conductor 8.

This allows a permanent vertical adjustment of the rapidly horizontally deflected "line" of light on the face of cathode-ray tube 1 and a corresponding adjustment in the inverse direction upon the film to be printed. Also, when the aspect ratio of the print is to be different than that of the film original the vertical adjust electronic source provides sawtooth deflection energy in the direction of the film motion to read the film more slowly or more rapidly than corresponding to its motion. In this way the frame lines are either decreased or increased in width in the print.

When it is necessary to reorient Vistavision scenes from the side by side position these occupy in the Vistavision format to the more usual format of one scene above the other along the film strip it is necessary that the scanning accomplished by cathode ray tube 1 be oriented vertically, in line with the length of film 9, rather than horizontally, or transverse thereto. This is not accomplished by turning the tube, but by turning the yoke by 90°. The yoke therefore has a quadrant 10 provided with gear teeth and a worm 11, externally supported, which engages the gear teeth. The worm is rotated by rotary actuator, or motor, 12. The latter is connected to card reader 5 by conductor 13, from which a punched card determines whether the normal or the 90° rotated position of the yoke 2 shall be used for the particular processing run. Two additional waveforms are supplied to the yoke to accomplish Vistavision scanning, as will be detailed below.

It is desirable that the return traces of both deflection elements 4 and 7 be eliminated from the trace of the fluorescent spot on the face of cathode-ray tube 1. This is accomplished by conveying a negative pulse formed as the first derivative of the sawtooth waveform, or otherwise formed, from sweep 4 to the control grid of gun 3 of the cathode-ray tube via conductor 14 and from adjust unit 7 via conductor 15.

Because only a line of light is employed across the cathode-ray tube screen rather than a full area raster as is conventional, I provide means to tilt the tube slightly without correspondingly tilting the yoke 2, which latter has a slightly oversize inner hole to allow this mechanical manipulation. The tilting is accomplished by a slow-moving eccentric actuator 16. This element is actuated from card reader 5 via conductor 17. Because a slight inclination of the cathode-ray tube will also slightly incline the gun 3 thereof, a slightly different bias from adjust 7 is required. These compensating functions are carried out by reciprocally placed punches in the card of the card reader 5.

The wavy element 18 directly in front of the face of cathode-ray tube 1 is a schematic representation of a light filter. The wavy shape of the schematic showing is not necessary in the actual structure of the filter, which is preferably planar. This filter is provided to allow alteration of the spectral response of the cathode-ray illuminating spot. With such it is possible to not only correct for spectral deficiencies in the spectrum of the fluorescent spot but to alter the rendition of the film 9 as desired in the color sense. Plural filters 18 may be employed, all occupying closely adjacent positions to that occupied by the one shown, and thereby plural corrections accomplished. One example of filter 18 is a filter of reddish hue to strengthen the relative red emission of the light from tube 1.

Lens 19 is the objective lens of the optical system and serves to form a reduced image of the fluorescent spot of tube 1 upon the film 9. This is to be noted by the greater distance from tube 1 to lens 19 than from lens to film 9. The size of the light spot on the cathode-ray tube is of the order of 1/10 millimeter in diameter. The ratio of the first to the second distance mentioned is conveniently four to one. One thousand line detail is obtainable per frame of usual motion picture film. This is close to the inherent resolving power of the emulsion and well within the allowed unsteadiness of theatrical motion picture projectors.

The system of Fig. 1 is for producing three separate primary color signals, corresponding to three (monochrome) color separation negatives in conventional printing. The color separation is achieved by dichroic or equivalent mirrors 20 and 21. These are positioned behind the film 9 where the spot of light will be intercepted and are arranged like a roof with a 90° included angle. Mirror 20 is constituted to reflect red light and to pass green and blue. Mirror 21 is constituted to reflect blue light and to pass green light.

The process for making these dichroic mirrors is well known. It is also known that such mirrors effect a relatively sharp and complete separation between the three primary colors. For obtaining color information from a negative film at 9 even narrower bands than obtained with the dichroic separation desired. Thus, for filter 22 a Wratten No. 29 is used to pass the red desired. For filter 23, Wrattens No. 47B plus 2B are used to pass the blue desired. For filter 24, Wrattens No. 16 plus 61 are used to pass the band representative of green desired.

In instances where film 9 is a color positive such sharp separation may not be desirable. This is because a less definite color separation often gives an improvement in the color rendition. For the first mirror 20 we now employ a quarter-silvered mirror deposited on thin glass instead of a dichroic mirror to reflect the illumination upward and for the second mirror 21 a quarter-silvered mirror instead of a dichroic to direct the light downward. The Wratten filters provide all the color separation in this modification. Red path filter 22 and blue path filter 23 remain the same but the green path filter 24 becomes Wratten No. 56. These filters would be infrequently changed in the usual run of processing so automatic means for changing have not been provided.

Directly beyond each filter mentioned is one of three de-motionalizing lenses 25. These image the cone of illumination from objective lens 19 upon the sensitive surfaces of corresponding photomultiplier tubes 27, 28, 29, which convert the red, green and blue illumination to electrical signals. Lenses 25 cause a defocused area of light to impinge upon each sensitive surface in a motionless pattern regardless of the motion of the spot in the plane of the film. This is desirable in preventing spurious signals arising from variation of sensitivity over the sensitive surface.

Photomultiplier tube 27 preferably has a red-accented characteristic and may be the RCA 7102 type with an S–1 spectral response. Photomultiplier tubes 28 and 29 have a substantially uniform green and blue response and may be the RCA 6217 type with S–10 spectral response. These known tubes contain an electron multiplier of ten multiplying stages, each having a secondary emission ratio reasonably greater than one. An overall accelerating potential of the order of 1,000 volts provides amplification of the minute photoelectric currents of hundreds of thousands of times.

Each of the photomultiplier tubes is followed by one or more stages of conventional video amplification as represented schematically by amplifiers 30, 31, 32. These bring each signal level to an amplitude of several volts and so make convenient the operation of the rebound limiters for each of the primary color channels. These limiters, 33, 34, 35, are of essentially identical construction and are included to remove the effects of scratches on the original film upon the print obtained from my apparatus.

It will be understood that the opacity of clear film is considerably less than the lightest opacity of any ordinary scene. Correspondingly, the amplitude of the video signal corresponding to a scratch in the film is greater by a like amount. By the simple process of setting an overload clipping level on the video signal the disturbing effect of the otherwise bright reproduction of the scratch is reduced. However, with means to reduce the amplitude of the video signal corresponding to the scratch to a valve approximating the average value of opacity of the scene I am able to largely remove its presence. It will be appreciated that this capability is valuable in reproducing historical film, from negatives from which many prints have previously been made, and from positives that have been exhibited a number of times but which constitute the only source of film material available.

I am able to reduce the scratch video signal to an average value by utilizing the energy of the initial rapid rise to actuate an average level setter of short duration, which duration is terminated by the reverse throw of the initially abnormally high scratch amplitude. The level setter may take the form of a bistable multivibrator, one equivalent signal level of which is at black level and the other is below that level by nearly the full contrast range of the signal channel. When the latter is combined with the overload signal the result is in the average contrast range. The leading edge of the scratch transient triggers the multivibrator from the black level and the following edge of the scratch transient returns the multivibrator signal level to black. In this way I am able to restore the damaged scene to a neutral value in which the defect is largely unrecognizable. The frequency capability of the multivibrator must extend to a fairly high video frequency in order to handle narrow scratches. It will be understood that this rebound limiter will also essentially remove clear film spots brought about by defective prior processing or cue marks which have been scratched upon or cut through the film base. Bistable multivibrators per se of the required frequency capability, such as the high speed Eccles-Jordan flip-flop, are packaged articles of commerce in the computer industry. Accordingly, this circuit is not further discussed here.

The next group of video elements in the three separation chains of apparatus consists of variable gain and gamma amplifiers 36, 37, 38. These are connected to accept the output from the appropriate rebound limiter and are also connected to tape reader 39 by conductors 40, 41, 42. The tape reader coacts to exercise continuous control over the functioning of the apparatus and will be further described later.

It will be understood that the overall contrast ratio of the scenes printed by my apparatus may be increased by increasing the amount of video amplification over what is easily empirically determined as an equivalent contrast ratio to the original film, and that the inverse is true. It will be further understood that the intra-range contrast ratio can be changed as may be desired by altering the shape of the transfer characteristic of an amplifier stage of the video amplifier; i.e., a gamma correction stage. For example, the reduction from linear variation of density occasioned by an overexposed negative or original print at low densities (bright portion of the image on the film), may be compensated for by a vacuum tube stage having approximately an exponential characteristic; i.e., a larger grid bias than usual, so that the curvature of the transfer characteristic reproduces the higher densities at a reduced value and the lower densities at an enhanced value. This causes the transfer characteristic to approximate a straight line.

Both variable gain amplifiers and gamma amplifier stages (having a non-linear transfer characteristic) are known to the video amplifier art. In further explanation of the above example of the expansion of the contrast range in the highlights reference is made to the "Orthogam" amplifier of Goodale & Townsend and the inverse by the "rooter" amplifier, both illustrated and described in the book, "Television," by Zworykin and Morton, 2nd edition, 1954, pp. 524–526 (Wiley).

The control over this portion of the system by tape reader 39 goes to which type of correction amplifier is switched in circuit and what degree of overall amplification is chosen for any particular portion of the film being reproduced. It is apparent that with such instrumentalities shortcomings in the original film can be largely removed from the print and that this may be accomplished on a scene-to-scene basis throughout the original because of the co-phased capability for modification afforded by the tape reader.

Subsequent to the recited elements, further video amplifiers 43, 44, 45 are connected to elements 34, 37, 38 in order to bring the signal level to a few tens of volts in order to properly control the intensity of the electron beams of reproducing cathode-ray tubes 46, 47, 48. The connections from the video amplifiers to the cathode-ray tubes are made to the control grid or to the cathode of the guns for each tube depending upon the positive vs. negative phase of the image desired upon the cathode-ray tubes or for secondary reasons of circuit design known to the video art. Normally, the phase relation throughout the whole system is arranged to provide a positive print from a a negative 9. By merely supplying a positive print for film 9 a negative print can be obtained. By switching in or out an additional phase-reversing stage under the control of the tape reader located in the variable gain and gamma elements a positive may be obtained from a positive or a negative from a negative.

While a color image reproduction could be formed by a single tricolor cathode-ray tube, such as the known shadow-mask type, I prefer to employ three separate cathode-ray tubes as shown. This allows greater opportunity for obtaining color balance under both usual and corrective conditions and for making other incidental adjustments to the image that exposes print 52. This latter film travels uniformly, as did film 9. Consequently, only line images are formed on each of the cathode-ray tubes 46, 47, 48, rather than complete images over raster areas as in usual television reproduction.

The matter of Vistavision orientation of prints is present in the printing operation as much as in the reading operation previously described. Thus, reproducing yokes 53, 54, 55 are constructed, mounted and provided with gear segments 56, worms 57 and actuators 59 as were the previously described yokes. The latter actuators are connected by conductor 60 to card reader 5 for appropriate actuation according to the punchings upon the card within said reader. Similarly, the matter of vertical adjust is provided by a separate conductor 61 from vertical adjust element 7. The adjustment upon conductor 61 is under the control of card reader 5 and tape reader 39 over separate control conductors with respect to that for reader conductor 15. The control conductors for the reader control are 62 and 63 from card and tape readers, respectively, whereas the control conductors for the reproducing conductors are 64 and 65. The actuation of these orientation controls may frequently be the same for reader cathode-ray tube yoke 2 and for the group of reproducing yokes 53, 54, 55, but since corrections to a given format and different formats are possible with separate controls these are provided in this instance and elsewhere in my apparatus to lend universality to it.

In a further similar manner slow moving eccentric actuators 66 serve to tilt the reproducing cathode-ray tubes in the same manner as utilized with actuator 16 previously described. This control is exercised from card reader 5 over conductor 67 and is independent of earlier control conductor 17.

In order that independent color correction may be accomplished for any set of conditions, separate Wratten or equivalent filters are provided in front of each reproducing cathode-ray tube. Filter 68, normally having a reddish hue, is placed in front of the red-reproducing cathode-ray tube 46 to enhance the sepectral purity of the red phosphor thereof. Wratten filters Nos. 16 plus 61 are suitable. Filter 69 is in front of the green cathode-ray tube 47 for color balance purposes upon the green light-emitting phosphor thereof. A Wratten No. 47B filter is suitable for this purpose. Filter 70 is similarly in front of the blue light-emitting phosphor cathode-ray tube 48 and a Wratten No. 29 filter is suitable for this position.

An arrangement of dichroic mirrors is positioned in front of the three reproducing cathode-ray tubes 46, 47, 48. Dichroic mirror 72 reflects the red light from tube 46 and passes both green and blue. Dichroic mirror 71 passes green light and reflects blue light. In this way the complete line color image is formed in front of objective lens 73. This lens is axially adjustable in mounting 74, which in turn is supported in light-tight housing 75. The optical paths from the three cathode-ray tube screens to the lens 73 are of equal length. Accordingly, the composite image of the line image is accurately focussed in a reduction ratio of at least a few times upon unexposed film 52.

In order to remove the horizontal squeezing of anamorphised original films when non-anamorphised prints are desired, the ratio of horizontal to vertical scan at the writing (reproducing) end of the process is increased. That is, the horizontal scans at both reading and writing instrumentalities cover the normal width of the film, but the effective vertical scan is decreased by vertically moving the line of light on scanning cathode-ray tube 1 in the direction of the motion of film 9 during the scanning of an image and returning it during the frame line interval according to a sawtooth waveform. Alternately, the horizontal scan of tube 1 is decreased in amplitude. This reduces the width of the image printed from the original film but renders it in the normal height-width ratio on the print.

Additional special effects, such as to remove or impose non-linear geometry in the print, may be introduced horizontally by corresponding non-linear sawtooth waveforms employed for the horizontal scan of either cathode-ray tube 1 or the group 46, 47, 48. Alteration of vertical linearity is accomplished by employing a non-linear vertical adjust waveform from element 7 upon cathode-ray tube 1. Otherwise linear sawtooth waveforms may be made non-linear in elements 4 and 7 by altering the time constant of the circuit forming such waveforms or by combining a linear waveform with a curvilinear waveform of the same or a harmonically related frequency and of fractional amplitude with respect to the amplitude of the sawtooth.

We now turn to a consideration of the film transport mechanism. Original film 9 (which may be a negative or a positive) is unwound from a conventional storage reel (not shown) and passes over required guide rollers, of which roller 77 is illustrative. This roller is preferably preformed to accommodate 8 mm., 16 mm., 35 mm., 55 mm., 65 mm., and 70 mm. film in the manner of the sprocket of Fig. 2, or a series of individual or partially universal rollers may be substituted to handle the particular film to be processed.

A film gate is positioned opposite lens 19 to insure that the film 9 shall always remain in the focal plane of that lens. This gate is conventional and has not been shown for sake of clarity. Sprocket 78 is the drive sprocket for film 9. It, too, is relatively close to the film gate. It is formed to handle various widths of film as will be described later. The sprocket is attached to the shaft of servo motor 79, which also includes a motor of conventional design to provide the major portion of the power required to move the film.

It is desirable that the motion of film 9 and the frequency of the sawtooth electrical waveform of horizontal sweep 4 be synchronized so that an equal number of lines will be scanned on each frame of the film and the image geometry will be uniform from frame to frame, particularly upon the resulting print 52. This synchronism can be accomplished by means of the synchronizing generator used with television cameras for maintaining a fixed ratio between horizontal and vertical scanning frequencies. Such a synchronizing generator is described in the book, "Television," by Zworykin and Morton, 2nd edition, 1954, pp. 594–596 (sec. 14.10) (Wiley).

The generator is essentially a frequency dividing circuit. The high (horizontal) frequency is stabilized by a piezo-electric crystal and the low frequency is synchronized from the high frequency counted down. In the present application the low frequency corresponds to that of selsyn 79 and this is driven by a high power electric amplifier having the counted down frequency as an input.

A preferred alternate makes use of the stability of the 60 cycle alternating current power system. The counted down frequency from the synchronizing generator is electronically compared with the alternations of the 60 cycle wave and a bias potential is formed which varies with any frequency variation of the high frequency scanning sweep. This bias is applied to the high frequency sweep (4) to counteract the frequency variation.

In the apparatus of Fig. 1 the frequency dividing circuit is a part of servo control 87. In the preferred alternate the power motor of conventional design forming a part of the selsyn unit 79 is of the synchronous type of good angular phase stability. As before, the selsyn part serves to generate alternating current to drive the similar unit 90 of the other film 52 in strict synchronism. In this manner the motion of the two films 9 and 52 and the spots of light which scan them are held in a unified synchronism. This whole system is actuated in precise relation to indexed perforations on film 9 by sprocket hole registry means to be later described.

After passing sprocket 78 film 9 is wound upon a takeup reel known to the art and therefore not shown. I have employed constant torque motors for the unwind and takeup functions to provide a uniform tension on the film while it is in the film gate regardless of the amount of film upon the reels involved.

A sprocket hole register optical system is shown above motor 79 in Fig. 1. This system includes in order in the optical path, incandescent (or equivalent) exciter lamp 80, a pair of plano-convex condensing lenses 81, film 9, further condensing lenses 82, and photoconductive or photoelectric cell 83. This optical system is arranged to give a sharply defined spot of light smaller than the size of the well-known sprocket holes in the motion picture film. The difference between the capacity of the clear film base and that of a free air path through the sprocket holes is sufficient to give a modulation of the light received by cell 83. This modulation is converted to an electric current by the cell and is amplified by amplifier 84 to a level of a number of volts.

It is not widely known that only certain perforations in a strip of motion picture film are accurately indexed to the image that has been either photographed or printed thereon. This is known to the special effects art, where unusual accuracy in image registration is required. In the Mitchell 170° type of registration the sprocket hole just above the picture on the sound track side is the sprocket hole that was fully registered when the film was exposed in the original camera or in a second special effects camera by an "in and out" camera registry pin. This arrangement provides both longitudinal and lateral placement. Directly opposite this perforation another sprocket hole was pin registered so as to give proper longitudinal orientation but the pin associated therewith had a few thousandths of an inch free space on each side of the perforation to accommodate shrinkage or other variations in the film. In the Bell & Howell 170° registration the same situation obtains, save that the register perforations are just below the frame in question and on the sound track side for the full registry pin as before.

In Fig. 1 it has been necessary to show the sprocket hole register entity 80—83 below the picture optical system 19—20, etc., in order to avoid serious drafting confusion. However, as will be understood from the above description the subject entity is actually mounted adjacent to the optical system 19—20 as shown by the asterisk (*). It is provided with an adjustable mounting to position the optical path either above or below the film frame being scanned for optical picture information. This is so that Mitchell or Bell & Howell registrations may be duplicated in processing by my machine. Card reader 5 controls which position the mounting shall take by an electrically controlled mechanical adjustment.

Any previous attempts to control film movement by registration with the sprocket holes optically has employed all the holes down one side of the film. It is apparent from what has been explained above that a control of this type is seriously lacking in precision.

For this reason I employ perforation register gate 85. In a characteristic adjustment this circuit allows only every fourth pulse to pass to the output. Connection 86 from the green separation amplifier 31 provides information as to where the picture is located on the film with respect to the frame line. The passage of a frame line in front of the picture scanning spot causes an absence of video signal as will be easily understood.

Gate 85 is essentially a multivibrator circuit which has an "off" period three times as long as an "on" period, as above adjusted. The gate is synchronized "on" by the absence of video signal as above mentioned and automatically blocks off the circuit thereafter due to its inherent flip-flop nature and period. The output from gate 85 is conveyed to servo control 87 over conductor 88. As has been described the servo control is constituted to move both the reading film 9 and the writing film 52 in synchronism. The sprocket hole registry information adds precision to this control. Information concerning the exact electrical nature of the synchronism for films of different formats (as 35 mm. for film 9 and 16 mm. for film 52) is conveyed to the servo control from tape reader 39 via conductor 89. Servo synchronization for the second servo motor assembly 90 is conveyed from servo control 87 via conductor 91. In this writing portion of my printer roller 147 is the equivalent of roller 77 previously described and sprocket 92 to previous sprocket 78. A film gate 93 is employed to guide the film 52 at the focal point of lens 73 in the same manner as a gate was employed previously for film 9.

It is highly desirable, although not necessary, to present a monitor image to the operator, by means of which he is enabled to check the operation of the major portion of the apparatus.

This is accomplished by providing color cathode-ray tube 94, which may be of the known shadow-mask type having three electron guns. One of these guns is connected to the output conductor from red channel amplifier 43, another correspondingly to green amplifier 44 and still another to blue amplifier 45.

A deflection yoke 95, adapted for both horizontal and vertical deflection of the electron beams from the three guns, surrounds cathode-ray tube 94. Horizontal deflection is accomplished by sawtooth scanning energy from horizontal sweep 4 via conductor 96. A separate vertical sweep oscillator 97 is provided. This operates in accordance with the vertical speed of film 9 and synchronizing information comes from servo control 87 via conductor 98. The horizontal sweep is also appropriately controlled to give an equal number of scans across the film or cathode-ray screen regardless of the speed of traverse of the film 9. This control is from tape reader 39 via a report-back connection 99 from servo control 87. This control insures that the number of lines per frame upon film 52 shall also be the same regardless of the longitudinal speed of that film.

Assuming that a color film 9 is being processed, it is apparent that the color television image presented upon color cathode-ray tube 94 provides a check upon the operation of all parts of the system save that of the reproducing tubes 46, 47, 48 and the exposure of film 52.

In order to indicate the relative signal levels in the three channels for color balance purposes waveform cathode-ray oscilloscopes 58R, 58G, 58B are provided. The vertical deflection means of oscilloscope 58R is connected to the output of red output amplifier 43. Oscilloscope 58G is similarly connected to the green output amplifier 44, and oscilloscope 58B is similarly connected to the blue output amplifier 45. The horizontal deflection means of each tube is connected to vertical sweep 97. As a consequence, the video signal of each color component channel is shown. These are compared with reference marks provided upon a transparent overlay 145 which indicate the signal amplitudes corresponding to an important color such as a flesh tone. A deficiency or excess in the color primaries will be noted and appropriate adjustment of the contrast or brightness may be made in the variable gain and gamma amplifier of the channel involved. The need for these adjustments may be noted in a trial run of film 9 only and the tape of tape reader 39 appropriately re-punched for the subsequent processing run.

It is important to note that in my electronic printer both contrast and brightness of any or all color component channels may be varied, whereas in printers of the prior art only brightness could be varied, as by varying the brightness of the printer light. Accordingly, not only can a proper flesh tone balance be struck electronically and a consistent neutrality attained in the rendition of hueless gray, but limitations of color film emulsions can also be overcome.

Contrast in the blue primary is often poor in rendering flesh tones. Because of imperfect behavior of the yellow dye in some color film an additional yellow is deposited in response to blue stimulation. This results in flesh tones of salmon hue. Such a condition is at once remedied by adjustment of electronic controls as has been indicated.

Waveform oscilloscopes 58R, 58G, 58B have been shown by way of example connected to the output circuits of the electronic portion of my printer. These may be switched by obvious known switching means to the input of the electronic portion; i.e., the outputs of linear channel amplifiers 30, 31, 32. This allows inspection of the color balance of the original film and is useful in a trial run of film 9 to originally determine what instructions are to be punched in the tape of tape reader 39.

As has been mentioned, there are a number of film formats in use today and the perforation registry of each is more often different than the same in relation to film length. The four perforation per frame example given corresponds to 35 mm. film of the long-standing format and also for Cinemascope in the 35 mm. version. However, Cinerama film, although 35 mm. in width, utilizes 6 perforations per frame. Accordingly, conductor 95 connects from card reader 5 to perforation register gate 85 to alter the time constants of the multivibrator circuit thereof. What is required is that the time constant of the gating waveform throw that opens the gate be reduced in duration and the time constant of the same that closes the gate be lengthened. This is brought about by decreasing the resistance of the time constant circuit for opening and by increasing the resistance of the time constant circuit for closing. This can also be accomplished by similarly altering the effective capacitances of the time constant circuits, or the change of both resistance and capacitance. These alterations are accomplished through conductor 95 actuating known relays in the gate entity 85 to effect the time constant changes mentioned.

Each of the labelled conductors shown in Fig. 1, as 6, 91, 95, etc., is composed of at least a plurality of separate insulated wires. In this way plural functioning over one conductor as illustrated is accomplished. The conductor establishes the existence of a wired communication channel from one block element to another. In Fig. 1 the extent of the plurality of separate circuits is made evident by the description of the circuitry of the blocks involved.

In further respect to formats, Vistavision has 8 sprocket holes per frame, with the image twice as wide as usual and lying with the width thereof in line with the length of the film strip rather than transverse thereto which has been standard for a long time. In order to properly gate Vistavision film the duration of the pass gate pulse may remain the same as for usual 35 mm. film but the duration of the off gate pulse is slightly more than twice as long as for the usual 35 mm. film.

A 55 mm. film, as currently produced by the 20th-Century Fox company, has 8 perforations per frame one the negative and 6 perforations per frame on the positive. The height of each of these films per frame is different and both are greater than the height of the usual 35 mm. frame. Thus the total period of a complete cycle of the gate must be longer than for the usual 35 mm. film, with this being greatest for the 55 mm. negative. Because of the greater number of perforations in the negative the pass interval must be shorter than for the positive. This alteration, and the alteration of both of the blocking intervals is easily accomplished for automatic punched card control as taught above.

A 65 mm. positive film for theatrical release is employed by the Todd-A.O. format and by MGM. It has 5 perforations per frame. The height of the frame is also different from that of the 55 mm. film, being less. A pass interval somewhat longer than that for the 55 mm. film is required and the blocking interval is easily determined by a comparison of the geometries.

A 70 mm. wide film is employed by the above-mentioned organizations for negatives, and for daily inspection prints made by contact printing heretofore. Five perforations are used per frame and equal frame height does not require any change in the gating with respect to that for the 65 mm. film.

For 16 mm. film there is only one perforation per frame and this, of course, is employed for registration. Accordingly, a gating function is not required and the gate is held open by a continuous potential supplied from or controlled by card reader 5.

Eight millimeter film also has only one perforation per frame and so the gate is also held open by the continuous potential referred to.

In the several above formats the accurately timed register pin perforation pulse passes to servo control 87 via conductor 88 and there synchronizes by electrical comparison the servo frequency which drives the selsyn system. The servo frequency is the same throughout the system when films of the same format are used for both 9 and 52. When these are not of the same format, as from a 35 mm. negative to a 16 mm. positive for reissue of a motion picture to television, electrical modification is introduced which drives motor 90 at the speed proper for 16 mm. although the register perforation pulses originate from 35 mm. film.

This modification also takes into consideration the different diameter drive sprockets and thus the different numbers of frames driven per revolution of the sprocket. While the perforation per frame parameter is fixed by the format the relative diameters of the drive sprocket for the different formats is a more or less independent parameter. In this way selsyn frequencies which are either multiples or submultiples of the frequency originally created may usually be used. A frequency twice that generated may be obtained by known frequency doubler means, either of the resonant circuit or of the rectifier type. A frequency half that generated may be obtained by known frequency dividers, as by multivibrator or counter circuits. Should non-harmonic frequencies be required, these may be electromechanically produced by linking mechanically selsyn motors and generators having an irrationally related number of poles.

Figure 2:
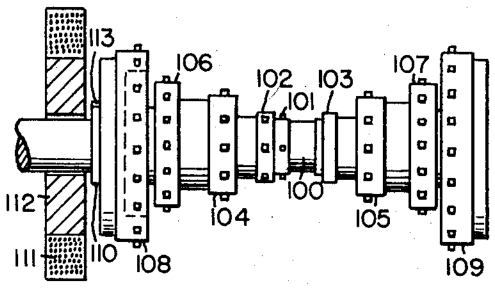
Fig. 2 shows the detail of a multiple film size sprocket.

A detailed view of a universal format drive sprocket, such as used at 78 and 92 in Fig. 1, is shown in Fig. 2. In each step for wider film the sprocket diameter is greater so that the wider film does not contact the teeth of any of the narrower widths. Thus, the inner diameter 100 is sufficiently wide for eight millimeter film and has a minimum of four teeth 101 so that one tooth is always in contact with the film for the usual degree of wrap-around of the film upon the sprocket. These teeth are found on only one side of the sprocket because the 8 mm. film is perforated on only one side.

The next larger diameter has one flange 102 with an increased number of teeth, as six, and is for 16 mm. film. A companion opposite flange 103 is of equal diameter but is without teeth since the sound track of 16 mm. film is on the side opposite the sprocket holes. Similarly, flanges 104 and 105 of still larger diameter and each having eight teeth accommodate 35 mm. film. Still larger and farther separated flanges 106 and 107, having twelve teeth each, accommodate 55 mm. film. Finally, still larger flanges 108 and 109, having sixteen teeth each, accommodate 65 mm. film.

The still wider 70 mm. film is accommodated by arranging outer flange 108 to slip axially on an inner hub 110 in an outward direction a distance of 5 millimeters. Spring ball detents (not shown) are arranged on hub 110 at the 65 and 70 mm. positions. The flange 108 is then manually shifted from one relatively locked position to the other.

For automation the detents are omitted and flange 108 permanently magnetized with a pole upon the outer (left) face. An electrical coil 111 having circular turns of wire in plural layers is disposed stationarily adjacent to flange 108 and coaxial therewith. This coil is energized with direct current in one direction and a pole is produced in inner pole piece 112 in polarity opposite to that of flange 108. Flange 108 is thus attracted and the sprocket is suited for 70 mm. film. When the coil is energized with current in the opposite direction a pole of the same polarity as that of flange 108 is produced and the flange is repelled. This suits the sprocket for 65 mm. film. A sufficient magnetomotive force to solidly position flange 108 in either the 70 or the 65 mm. position against mechanical stops is easily arranged with a current of a fraction of an ampere. Mechanical drive of flange 108 is provided by key 113. This is held in hub 110 and has a sliding fit slot in the inner hole of the flange.

Figure 3:
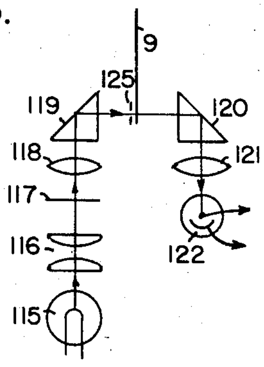
Fig. 3 is a plan view of an alternate embodiment of sprocket hole registration optical system.

The sprocket hole registry optical system 80, 81, 82, 83 illustrated in Fig. 1 is capable of refinement as shown in the plan view of Fig. 3.

A source of illumination 115, substantially as before, is provided with a pair of condensing lenses 116 to illuminate restrictive horizontal slit aperture plate 117. Objective lens 118 forms an image of the aperture plate on film 9. The light path is bent 90° by right angle prism 119. The latter is employed to mechanically offset the optical system for the sprocket hole registration at the light gate where the television-like scanning of the picture upon the film takes place. In this way the elements of the two light paths do not interfere.

After passing through the perforations in the film the light from the sprocket hole registery optical system impinges upon a second right angle prism 120 and is again bent 90°, traversing a parallel but opposite path to the original one. Lens 121 collects the divergent illumination that was focussed at the film. This illumination then strikes photoelectric cell 122. A photoemissive cell has been diagrammed, but this may also be a photo-conductive cell such as cadmium sulphide or selenium. For these latter the illumination must be relatively high, above 60 foot candles, so that the response time of the cell is sufficiently rapid. A photomultiplier type of photoelectric transducer may be substantially employed, of course.

The well-known Bell and Howell perforation has arcuate sides. I employ this feature to give a relatively very sharp light pulse which indicates the position of a given perforation with respect to the position of an optical system of the types described.

Figure 4:
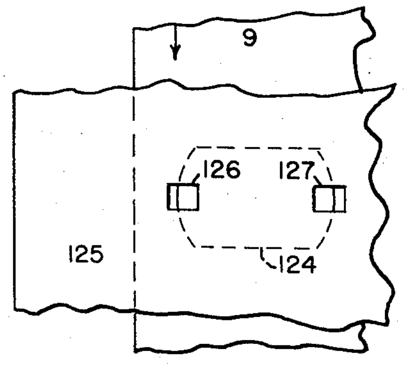
Fig. 4 shows a greatly enlarged front elevation of a film sprocket hole and a mask optically coactive therewith.

Fig. 4 shows a greatly enlarged view of one sprocket hole 124 in dotted representation behind an optical mask 125 which covers most of it from the light path of the optical systems mentioned. Two apertures 126 and 127 are formed in mask 125 at substantially the maximum width of the sprocket hole. Mask 125 is positioned longitudinally of the film and in relation to the scanning line traversing the image upon the film so that the relation of apertures and sprocket hole shown in Fig. 4 occurs when a registry hole is in the position of registration in my printer.

As film 9 moves downward, for instance, to the position shown in Fig. 4, it will be seen that the light flux passed by apertures 126 and 127 will increase from zero to a maximum value when the greatest width of the perforation is directly opposite the apertures, and that the illumination will decrease again to zero according to the same function that describes the increase. In addition, film 9 has a finite thickness and relatively smooth inner surfaces of the curved sides of the sprocket hole. This causes a specular reflection from the sides of the sprocket hole the light from which is collected by lens 121 (Fig. 3) and passed on to photocell 122 when the film is exactly in the registry position. In other positions of the film any such reflection is directed in such a direction as not to enter the photocell.

Figure 5:
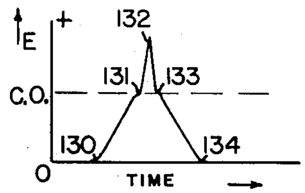
Fig. 5 shows an electrical pulse waveform resulting from the coaction of Fig. 4.

The illumination through the apertures and thus also the electrical waveform from the photoelectric cell 122 as above described is illustrated in Fig. 5. The voltage across the output resistor associated with the photoelectric transducer is plotted vertically as the ordinate and the horizontal abscissa is time. Only a passage of one sprocket hole is shown. The voltage pulse starts at point 130 in Fig. 5, when the sprocket hole first enters the area of the apertures, and increases fairly rapidly to point 131. Here the specular reflection occurs and results in sharp peak 132. The reverse process occurs at points 133 and 134 on the decreasing amplitude side of the pulse.

Utilizing the known technique of waveform clipping, as by impressing the pulses of Fig. 4 upon the grid of a vacuum tube biased so that all of the waveform below the cut off level C.O. is not reproduced in the plate circuit of the tube, it is possible to retain only the peaks 132 in the signal channel beyond. These are amplified in register gate entity 85 of Fig. 1, are gated as has been described, and are employed to control the servo system to exact synchronism with the film through control 87.

Mechanical lateral guidance of the films 9 and 52 is provided by making the fit of the sprockets to the perforations as precise as possible while still allowing the film to enter and leave the sprocket. Also, a small guide roller 26 is provided at the sound track edge of film 9 and a corresponding one 144 for film 52. These are located close to the scanning gate, as 93, for film 52.

On DuBray-Howell and positive stocks rounded sprocket holes are not used. Accordingly, I arrange the system for sprocket hole registry shown in either of Figs. 1 or 3 to be rotatable 90° in order to actuate upon the upper surface of these rectangular perforations. Known mechanical expedients are employed to shift the position of the registry optical system with respect to the image scanning gate in this rotation so that the upper left rather than the lower left sprocket hole is used for registration as required. The separation between apertures 126 and 127, Fig. 4, is also reduced to correspond to the lesser dimension of the perforations vertically than horizontally. This is accomplished by replacing shield 125 with another having reduced separation or by employing a two piece shield which overlaps and thus may be adjusted for the desired spacing between the two apertures. As a desirable alternate the two piece shield alone may be rotated and the whole optical system retained in one orientation, save for slit aperture 117 as used in the optical system of Fig. 3.

A number of alternate constructions of my electronic printer are useful in preparing motion picture prints for either theatrical exhibition or for television.

Instead of one composite color negative or positive film 9 as shown in Fig. 1 it may be desirable to read picture area information from three so-called color separation negatives (or positives). This is accomplished essentially by duplication of facilities. Three film transport and scanning devices are provided, each having a cathode-ray tube scanner 1, drive 79, etc, sprocket register 80—83, "green" image channel 25, 28, 31, 34, 37, 44, etc., but the dichroic elements 20, 21 and the other color channels are omitted. Monochrome film scanning "heads" are thus provided. In one of these the green separation film is run. The green separation is a black and white film originally exposed through a green filter so that the visual information corresponds to the green light intensities in the scene. This monochrome head thus becomes a source of green channel video signals. In another head the red separation film is run, and in still another the blue separation film is run.

From the electrical standpoint red, green and blue video signals are produced by this process just the same as though a composite film in color had been employed for film 9 in the tri-color head of Fig. 1. According to electronic convenience the video outputs from the three monochrome heads may be impressed upon the inputs of amplifiers 30, 31 and 32, or equivalent preamplifiers provided at each head. One perforation registry system is employed, on the green separation film, and the other two film transports are run in strict synchronism with it through the servocontrol 87, as though these were the equivalent of film 52 in the system originally described.

A similar substitution of duplication may be made at the reproducing end of my system. Only one reproducing cathode-ray tube, as 47, is employed for each film transport 90, 144, 147, etc., and three such transports are provided. This arrangement allows three color separation films to be produced from one original film 9.

For printing one black and white reproduction from one black and original only two monochrome heads are required, one for reading and one for writing. It will be seen that with eight heads all types of printing can be accomplished; color composite to color composite as shown in Fig. 1, color composite to color separations as described, color separations to color composite, and mnochrome to monochrome. It might be added that color to monochrome can be accomplished by utilizing a composite original if the only record at hand, or by printing from the green separation if available.

In the art, use is often made of internegative films for color work. By employing three black and white internegatives the best color rendition is obtained. This is because the gamma of each negative can be separately controlled. The effect of grain of silver smulsion is also reduced. The cost, however, of such processing is higher than employing a tripack negative. Also, a set of negatives are usually required for making contact prints and another set of different exposure for making prints by optical printing.

In my electronic printer this technique can be accommodated with slight modification and with desirable versatility. An internegative, such as the current Eastman

#5245, is false-sensitized as to color so that best dye rendition can be accomplished in the finished result. This means, that the blue color is not exposed with blue light, but with red light, and so on.

Specifically, the blue record is known as the yellow master and prints from the blue video signal through a red filter, Wratten No. 29, for example. Thus, the blue signal obtained at photomultiplier 29 in Fig. 1 is switched over to the red reproducing channel by suitable activation of the blue variable gain and gamma entity 38. Necessary instructions are provided from tape reader 39 by an appropriately punched tape and are conveyed over one or more of the wires in multiwire conductor 42 to entity 38. The switch-over is accomplished via conductor 140, connecting between entities 38 and 36, the latter being in the normal "red" channel. The No. 29 filter replaces the normal red one at 68 in the reproducing cathode-ray tube chanel. In order to provide separate negatives three separate heads are provided as has been described above.

The green record is known as the magenta master and prints from the green video signal through a blue filter, Wrattens Nos. 47B plus a 2B, for example. The 2B filter removes any ultra-violet light from the phosphor screen source.

The red record is known as the cyan master and prints from the red video signal through a green filter, Wrattens Nos. 16 plus 61, for example. Instructions from the tape reader 39 are conveyed to the green variable gain and gamma entity 37 over conductor 41 and the green signal passes from entity 37 to entity 38 via conductor 141. Similarly, further instructions from tape reader 39 are conveyed to the red variable gain and gamma entity 36 over conductor 40 and the red signal passes from entity 36 to entity 37 via conductor 142.

With this same structure and slightly different programming the equivalent of positive masks may be obtained. In order to produce a mask corresponding to a given primary color for inserting in another color channel it is merely necessary to feed a small amplitude of signal from the color channel required to supply the mask to the other color channel to be masked with phase opposition of the video waveforms. This is accomplished in my printer by utilizing the cross-connections 140, 141, 142 between the variable gain and gamma entities 36, 37, 38 with tape and card readers 39 and 5, or both of them, programmed to feed the low amplitude of phase opposed video signals as required to accomplish the particular mask or masks desired.

In certain color work a fourth rendition of the picture is made in black and white. This is combined with the three color records and often provides additional sharpness to the end result. Such rendition has been employed in color motion picture film produced by the Technicolor process and it is also known in the color printing art.

This effect is obtainable in my printer by simply programming the card and/or tape readers 5 and 39 to combine a fractional amplitude of the video signals in the red and green channels in phase addition. I have found that a minus blue filter in original photography creates the most pleasing rendition for black and white photography. By omitting the blue video channel in this instance the same effect is obtained. For other effects, of course, other channels may be combined to supply the "black and white" rendition.

It will be realized that the gain and the gamma of each color channel can be varied at will in my electronic printer. This makes it possible to print from negatives originally exposed for contact printing while accomplishing an optical printing process. In other words, it provides the flexibility of processing heretofore accomplished only by making a new set of three negatives, dupe negatives, etc. for different color balance without the considerable expense and time required for actually making these films. This flexibility by means of electronic signal control is highly valuable in almost every process accomplished with my printer and results in saving intermediate steps. As has been previously described, any desired control over the gain (overall contrast) and the gamma (shape of the contrast function within the overall contrast range) can be exerted by appropriately punching the control tape.

In the prior art, various effects, such as fade out, fade in, superimposition of two pictures and cross fades between two scenes are accomplished by what is known as the A and B roll method. In this method an A roll of original film is prepared, also a B roll, both having scenes desired in the resulting print. With the A roll in the printer, say, the raw print stock is exposed to a desired footage count and then the exposure is progressively reduced to zero, usually over a length of four feet, by the operation of a dissolve shutter in the known printer camera. Subsequently, the raw stock is rewound to a new start mark, the B roll threaded in the printer head and the printer and camera restarted with an opening of the dissolve shutter at the proper footage count.

In my electronic printer an A roll is placed on one film reading transport apparatus and the B roll on another. The brilliance of the scanning spot on each reading cathode-ray tube, such as 1 in Fig. 1, is directly controllable by a suitable tape in tape reader 39. At the appropriate footage the bias on the reading cathode-ray tube involved is gradually changed from that giving full illumination intensity to zero intensity. A simultaneous inverse control of the bias on the cathode-ray tube illuminating the B roll brings the scene from the B roll onto the raw film to form a lap dissolve. It will be noted that the raw film need not be rewound, nor even stopped. Also, start and stop commands may be given to the film transport mechanisms from the tape reader to automatically inter-dissolve the scenes.

For accomplishing a superimposition both cathode-ray tubes are operated with illumination spots at once, while for a fade to black neither cathode-ray tube is operative. Should visual material from three films be required to be combined this can be accomplished by merely adding a third reading head, and so on.

It will be appreciated that the versatility of my electronic printer reduces to a minimum the editing and hand manipulation of the films involved.

It is known in the art that about 40% of the negative in a feature motion picture or the equivalent must be "duped," that is, transferred to duplicate negative in order that various usual and desirable effects may be added. Some of these have been treated above with respect to my printer. A further illustration concerns impressing a title over a scene. This requires a traveling matte which is arranged as follows. A separate ("matte") film is made having the title in opaque letters with the rest of each frame clear film. This film is run in physical contact with the film containing the scene and the raw stock is exposed. The exposure process is repeated employing another film having the title in letters and artistic details as desired in the finished work, the remainder of each frame of this second title film being opaque.

Rather than rewinding the raw film for the second exposure it will be understood that the two processes may be carried out simultaneously by using two reading heads and combining the video signals electronically as has been previously pointed out.

By arranging that a matte shall change from clear film to opaque film in sequence across the frames a horizontal, vertical, diagonal, etc. wipe can be acomplished.

Accordingly, there is provided in my electronic printer a modification of the original construction which merely duplicates the drive facilities shown in connection with the films 3 and/or 52. This allows both original film and matte to run in contact together. Two storage reels and two takeup reels are employed, each on known constant torque motors as has been described. Two rollers 77 and 147 and two drive sprockets 78 and 92 are provided. These are offset sufficiently to clear the respective reels but are close enough to allow the films to run in contact through the image scanning gates, as 93.

The mattes may be run in contact with the original films only when electronic combination of plural visual information is employed and the raw film is not rewound. If the raw film is rewound the mattes may be run in contact with the raw film. In general, where the matte is run depends upon what size of matte may be on hand. In the process of reducing 35 mm. film to 16 mm. film for general television release of an existing feature, a 35 mm. matte would likely be on hand and so this would be run with the 35 mm. negative as a composite original film 9. In other work if only a 16 mm. matte was available it would be run as a composite with the raw film 52. Partial mattes may be run in conjunction with both films 9 and 52 if this is necessary or desirable. In any event, the opportunity to electrically mix plural scenes and mattes without rerunning the raw film is a new contribution of my electronic printer.

In handling Vistavision film a large degree of vertical adjust is required from entity 7 to scan the film transverse of its motion and also applied to the "horizontal" sweep deflection coils of yoke 2 (now turned vertical) so that the many longitudinally disposed scanning lines will be longitudinally displaced according to the travel of the film and therefore be positioned one above the other within one frame. The vertical adjust waveform is a sawtooth, having an amplitude equal to the whole width of one Vistavision frame. This causes the reading or the writing in my printer to follow with the motion of the film until the traverse of the whole area of a frame has been completed and then to quickly pass backward with respect to the direction of film travel to start the next frame. Sawtooth current waveform generators are known from television technology and do not need to be further described.

In rotating the yoke of each scanning cathode-ray tube for Vistavision processing a limit switch coactive with the actuator (12, etc.) is preferably employed to accurately limit the travel to 90°.

It will be recalled that processing rates considerably below the repetition rate for usual television (60 fields, 30 complete frames per second) are preferred in my printer. Relatively flicker-free images may be obtained on the monitor cathode-ray tube 94 if slow decay phosphors are used for the screen of that tube. Such phosphors were developed by the Du Mont organization during the formulation of the United States black and white television standards. This is reported in the book, "Television Standards and Practice" (NTSC), D. Fink, McGraw-Hill, 1943, pp. 41–44, and also in the report "The Du Mont Television System," Document 148R, Panel 1, National Television Systems Committee. Of course, the conventional color cathode-ray tube may be employed and some flicker tolerated.

An alternate electronic device for scratch elimination, the rebound limiters 33, 34, 35, is the Schmidt trigger circuit. This waveform device gives an average value of signal intensity for a high value of scratch amplitude and is turned on and turned off by the start and the stop of the high scratch amplitude signal. This circuit is given in the "Reference Data for Radio Engineers" publication of the International Tel. & Tel. Corp., 4th edition, p. 468, and need not be further described here.

It will be understood that while simple converging lenses have been shown in Fig. 1 at 19, 73, etc., these may be the multiple element lenses known to the trade for photographic purposes and which include figuring for minimum color, spherical and other aberrations.

It is understood that brightness of the images as represented by video signals may be increased by increasing the amplitude of a feed-in of blanking signals, formed in horizontal sweep 4 and previously applied to the grid of cathode-ray tube 1, into the variable gain and gamma entity of any of the color channels shown in Fig. 1. This is according to usual television video techniques.

The matter of recording sound upon motion picture film has not been detailed herein. Particularly in color film processing the sound track is invariably printed as a separate process. This is so that a metallic silver sound track will be obtained rather than one in a color dye. A color dye is the final record on a color motion picture film and such a dye does not give satisfactory sound reproduction. Sound reproducing equipment, either optical or magnetic, may be added to the film transport for original film 9 in order to obtain an electrical signal according to previously recorded sound on film information. The sound may also be obtained from separate sound film. This may be synchronously run with film 9 or the whole sound process of printing accomplished separately after the visual printing has been completed but before development.

A corresponding optical or magnetic recording head is also attached to the transport path for film 52, or separately arranged for subsequent printing, by known methods. A composite sight and sound print is thereby obtained.

Footage counters and similar auxiliaries may be added to my electronic printer for convenience and refinement as will be understood by those skilled in the art.

Electronic means specified herein include all kinds of electrical means in which an electron current may be caused to flow. Such means include solid state devices, transistors, resistive and reactive components as well as electron flow in a vacuum as in vacuum tubes.

Still other modifications may be made in the arrangement, size, proportions and shape of the illustrative embodiments shown and described herein. It will be understood that these have been presented by way of example and that changes therein to fit individual requirements do not constitute departures from my invention.

Having thus fully described my invention and the manner in which it is to be practiced, I claim:

1. The method of duplicating motion picture film which comprises the steps of continuously moving an original film, systematically traversing the area of said original film, forming electrical signals corresponding to the opacities of said original film along the traverse, externally altering said electrical signals as a function of the motion of said original film in a predetermined manner, converting said electrical signals into corresponding light intensities, and impressing said light intensities upon an unexposed film in a systematic traverse of said unexposed film while moving the same in synchronism with said original film.

2. The method of reproducing motion picture film in a format differing from that of an original film which comprises the steps of continuously moving said original film, systematically traversing the area of said original film, forming electrical signals corresponding to the opacities of said original film along the traverse, externally altering said electrical signals as a predetermined function of the longitudinal motion of said original film, converting said electrical signals into corresponding light intensities, and impressing said light intensities upon an unexposed film of format different from that of said original film in a systematic traverse of said unexposed film corresponding to the traverse made of said original film while moving said unexposed film in synchronism with said original film.

3. The method of duplicating plural motion picture films which comprises the steps of moving a first motion picture film having pictorial information and a pictorial information obscuring means in contact therewith, synchronously moving a second motion picture film having pictorial information intended for reproduction in the area where said obscuring means masks said first motion picture film, forming first video signals according to the pictorial information of said first motion picture film in combination with the equivalent pictorial information of said obscuring means, forming second video signals according to the pictorial information of said second motion picture film, combining said first and said second video signals in like polarity and reproducing the combined pictorial information on a third synchronously moving motion picture film.

4. The method of duplicating plural motion picture films by the matte process which comprises the steps of continuously moving a first motion picture film having pictorial information and continuously moving a film matte in contact therewith, synchronously and continuously moving a second motion picture film having pictorial information intended for reproduction in the area where the matte masks said first motion picture film, forming first video signals according to the pictorial information of said first motion picture film in combination with the equivalent pictorial information of said matte, forming second video signals according to the pictorial information of said second motion picture film, combining said first and said second video signals in the same image phase and reproducing the thus combined pictorial information on a third synchronously and continuously moving motion picture film from the combined video signals.

5. In combination in an electronic printer for color motion picture film having means for converting film images into a plurality of color component video signals in the same plurality of color component video signal channels, means for accomplishing masking in a color photographic process by electronic means which include a connection between at least two of said plurality of color component video signal channels, means to apply a fraction of the video signal from that color component video signal channel having the color component selected for masking to another of said plurality of color component video signal channels having the color component selected to be masked, in the phase to oppose the phase of the video signal in the video signal channel having the color component selected to be masked.

6. An electronic printer for strip film having means for printing a cross fade from one scene to another by an uninterrupted process comprising first means including a flying spot cathode ray tube device for forming video signals from a first film having one said scene, second means including a flying spot cathode ray tube device for forming video signals from a second film having said another scene, means to control the light intensity of said flying spot of said first means to gradually reduce from a given amplitude the video signals formed thereby to zero and to simultaneously control the light intensity of said flying spot of said second means to gradually increase the amplitude of the video signals formed thereby from zero to a given amplitude, means to combine said video signals and electron-optical means to print a scene from said combined video signals.

7. An electronic printer for color motion picture firm having means for printing a cross-fade from one scene to another by a continuous printing process comprising first plural color channel means including a flying spot scanner for forming color component video signals from a first film having one said scene, second plural color channel means including a flying spot scanner for forming color component video signals from a second said film having the other said scene, means to control the illumination of the spot of said first means to gradually reduce from a normal amplitude the video signals formed thereby to zero and to simultaneously control the illumination of the spot of said second means to gradually increase the amplitude of the video signals formed thereby from zero to a normal amplitude, means to combine said video signals in corresponding said plural color channels, and electronic means to synchronously print a composite color scene according to said combined video signals.

8. In combination in an electronic printer for color motion picture film having reading electronic means for converting images upon a first film into color component video signals and writing electronic means for forming corresponding images upon a second film; means for producing an essentially black and white video signal for inclusion with the color video signals which include cross connections between color component channels of said reading electronic means, means to convey a fraction of the amplitude of the video signals occurring in at least two of said color component channels through said cross connections to other color component channels, said fraction of the amplitude of said video signals having the same phase as the video signals of said other color component channels, and means for writing all said video signals in color upon said second film.

9. In combination in an electronic printer for color motion picture film having reading electronic means for converting images upon a first film into color component video signals and plural writing electronic means for forming corresponding color images upon other films; means for producing an essentially black and white video signal for inclusion with the color video signals which includes a cross connection between the red and the green color component channels of said reading electronic means, means to convey a fraction of the amplitude of the video signals occurring in said red and green color component channels through said cross connection, said fraction of the amplitude of said video signals conveyed having the same phase as the video signal of the color component channel to which it is conveyed, and means to convey all said video signals to said plural writing electronic means.

10. In combination in an electronic printer for film having electronic means for converting opacities upon an original film to an alternating electrical signal and further electronic means for recording corresponding opacities in corresponding relative positions upon another film according to said alternating electrical signal, both of said films having perforations and both of said films being moved in order to accomplish the printing process; means for synchronously moving both films which includes, means coactive with the perforations of said original film to form an electrical pulse, electrical gating means coactive with said means coactive with the perforations and with the electronic means for converting opacities into an alternating electrical signal to pass only selected said electrical pulses having a predetermined relation to opacities upon said film to thereby register the recorded corresponding opacities upon said other film in the same relation to selected perforations in said original film.

11. The combination of claim 10 in which plural original films are moved in register according to selected perforations of one original film for recording opacities from plural original films upon one said other film.

12. In combination in an electronic printer for aperture-drive film having first electronic means for converting information disposed over an area upon a first film into electrical impulses and second electronic means for disposing corresponding information over an area on a second film of format different from that of the first; electronic computer means electrically connected to said first electronic means and to said second electronic means to adjust these means corresponding to the formats selected in said electronic computer means, plural format means for driving both said first and said second electronic means having sub-means to shift from at least one format to another under the control of said electronic computer means, means to register the motion of said first film coactive with selected apertures thereof, and means to drive said second means connected to said means to register and to said electronic computer means to move said second film in said second means proportionally according to said different formats.

13. The combination of claim 12 in which plural first electronic means synchronously move plural color component films of similar formats for simultaneous reproduction upon a single color film of a different format.

14. In an electronic printer for motion picture film having reading electronic means for converting images upon a first film into television impulses and writing electronic means for forming corresponding images on a second film of format different from the first, card controlled means electrically connected to said reading and to said writing means to adjust these means corresponding to the formats preselected upon said card, a plural format sprocket for driving both said reading and said writing electronic means having magnetic means to shift from at least one format to another under the control of said card controlled means, means to register the motion of said first film coactive with selected sprocket holes thereof, and electromechanical means to drive said writing means connected to said means to register and to said card controlled means to synchronously move said second film in said writing means proportionally according to the ratio of said formats.

15. The combination of claim 14 in which plural writing electronic means proportionally move plural films of different formats for simultaneous writing from the reading of a first film of a format independent of said different formats.

16. An electronic printer for motion picture film having means for altering the brightness, contrast and gamma of the original motion picture comprising means for producing video signals according to the opacity of said original motion picture, means for amplifying said video signals, first means to selectively insert a preferred amplitude of blanking signal corresponding to black into said means for amplifying to alter the brightness represented by said video signals, second means to selectively alter the amplification of said means for amplifying to alter the contrast represented by said video signals, third means to selectively alter the shape of the amplitude transfer characteristic of said means for amplifying to alter the gamma represented by said video signals, and tape-like means synchronously operable with the printing process of said electronic printer to automatically alter at least one of said brightness, contrast and gamma according to preselected commands from said tape-like means.

17. An electronic printer for color motion picture film having means for altering the brightness, contrast and gamma of the original motion picture comprising means for producing a plural separate video signals according to the color components of said original motion picture, plural separate means for amplifying said separate video signals, first means to selectively insert a preferred amplitude of blanking signal corresponding to black into each of said plural separate means for amplifying to alter the brightness represented by said video signals, second means to selectively alter the amplification of each of said plural separate means for amplifying to alter the contrast represented by said video signals, third means to selectively alter the shape of the amplitude transfer characteristic of each of said plural separate means for amplifying to alter the gamma represented by said video signals, and tape-like means synchronously operable with the printing process of said electronic printer to automatically alter at least two of said brightness, contrast and gamma according to a preselected routine during said printing process.

18. An electronic printer for motion pictures having means for altering the format of the printed film from that of the original film comprising, means to transport said original film, means to form electrical pulses of frequency related to said transport, said means coactive with said original film, cathode-ray means to move a spot of light across said original film, photoelectric means adjacent said original film to produce electrical signals according to the opacities of said original film; an electronic control means, said control means connected to said cathode-ray means to control the intensity of said spot of light and the position, the extent and the direction of motion thereof; further cathode-ray means for successively reproducing a line of a television image corresponding to the opacities of said original film; an unexposed film, means to transport said unexposed film, means for forming an image of said line of a television image upon said unexposed film to expose the same; said means to form electrical pulses connected to said means to transport said unexposed film to control the speed of transport of said unexposed film relative to that of said original film, and said electronic control means prearranged to accomplish printing according to a selected format upon said unexposed film.

19. An electronic printer for color motion pictures having means for altering the geometrical format of the film printed from that of the original film comprising means to longitudinally transport said original film at a uniform speed, means to form an alternating current of frequency proportional to said speed, said means coactive with selected sprocket holes of said original film, a high intensity cathode-ray tube having a white-light-emitting phosphor screen of persistence a very small fraction of the time required for one traverse of the spot of light thereof across said screen, optical means for forming a reduced size image of said spot upon said original film, a plurality of dichroic mirrors and of photomultiplier tubes disposed behind said original film with respect to said optical means to simultaneously produce electrical signals proportional to the blue, green and red color components of said original film; means to separately amplify said electrical signals, an electronic computer, said computer connected to said cathode-ray tube to control the intensity of said spot of light and the position, the extent and direction of said traverse, said computer connected to said means to separately amplify said signals for the independent control of the amplification of said signals; cathode-ray tube means for successively reproducing a line of a color television image, said means to separately amplify said signals connected to said cathode-ray tube means for the color control thereof, an unexposed color film, means to longitudinally transport said color film in the absence of light at uniform speed, further optical means for forming a reduced size image of said line of said color television image upon said unexposed color film, said means to form an alternating current electrically connected to said means to longitudinally transport said color film via said computer for the control of the speed of transport of said color film relative to said original film, and means to program said computer, said means to program prearranged to effect color printing according to a selected format upon said unexposed color film.

References Cited in the file of this patent

UNITED STATES PATENTS

| | | |
|---|---|---|
| 2,546,338 | Glasford et al. | Mar. 27, 1951 |
| 2,594,715 | Angel | Apr. 29, 1952 |
| 2,843,011 | McLeod et al. | July 15, 1958 |
| 2,844,070 | Dresser | July 22, 1958 |